United States Patent [19]
Benoit

[11] Patent Number: 5,301,396
[45] Date of Patent: Apr. 12, 1994

[54] FASTENER ASSEMBLY WITH COMPRESSION MEMBER

[75] Inventor: Thomas A. Benoit, Bourbonnais, Ill.

[73] Assignee: Illinois Tool Works Inc., Glenview, Ill.

[21] Appl. No.: 975,076

[22] Filed: Jan. 13, 1993

[51] Int. Cl.⁵ .................................. F16B 19/00
[52] U.S. Cl. .............................. 24/453; 24/297; 411/509
[58] Field of Search ............. 24/453, 289, 297, 573.1; 411/509, 508, 510, 913, 448, 449

[56] References Cited

U.S. PATENT DOCUMENTS

| | | | |
|---|---|---|---|
| 2,368,027 | 1/1945 | Johnson | 411/509 |
| 3,092,175 | 6/1963 | Suessle | 160/390 |
| 3,217,584 | 11/1965 | Amesbury | 85/80 |
| 3,905,270 | 9/1975 | Hehl | 411/509 |
| 4,495,380 | 1/1985 | Ryan et al. | 174/138 |
| 4,715,095 | 12/1987 | Takahashi | 24/453 |
| 4,765,036 | 8/1988 | Iguchi et al. | 24/289 |
| 4,927,287 | 5/1990 | Ohkawa et al. | 411/510 |
| 4,987,656 | 1/1991 | Sato | 24/297 |

FOREIGN PATENT DOCUMENTS 0753012  2/1967  Canada ..................... 24/297

Primary Examiner—Victor N. Sakran
Attorney, Agent, or Firm—T. W. Buckman; J. P. O'Brien

[57] ABSTRACT

A fastener assembly for engagement with an aperture in an article including a fastener having at least a shank, a head at a first end of the shank and a resilient retaining member along the shank for releasably retaining the fastener to the article after insertion of at least a portion of the retaining member within the aperture, and an engagement member for compressing the retaining member prior to insertion within the aperture and contact of the retaining member with the article, and for preventing compression of the retaining member by the article about the aperture.

20 Claims, 2 Drawing Sheets

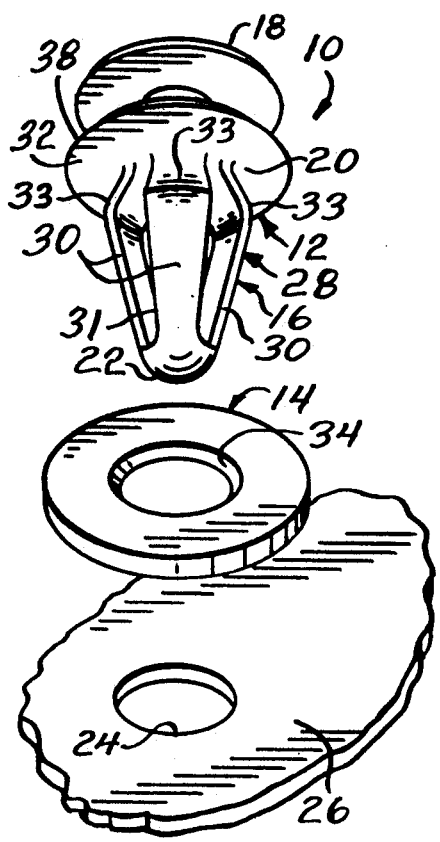
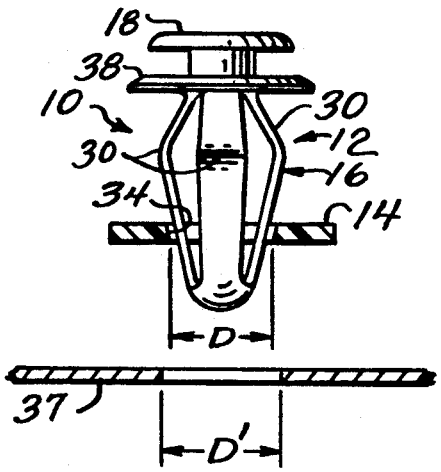
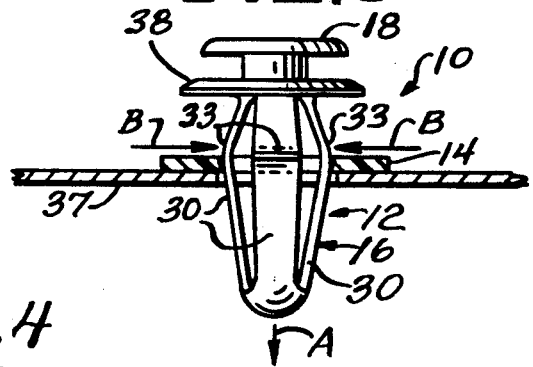
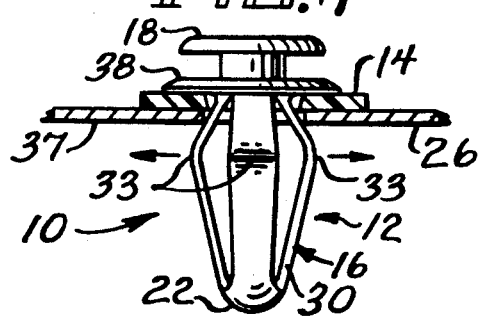
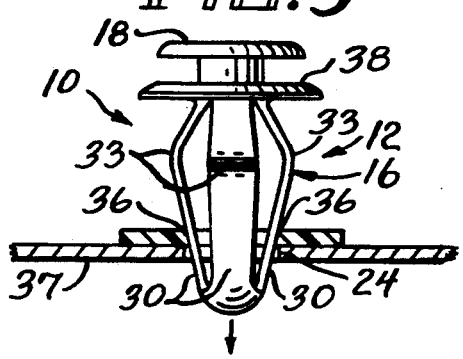
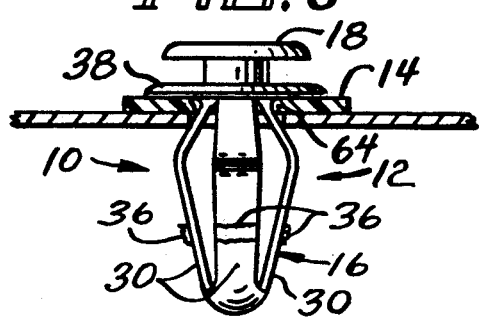

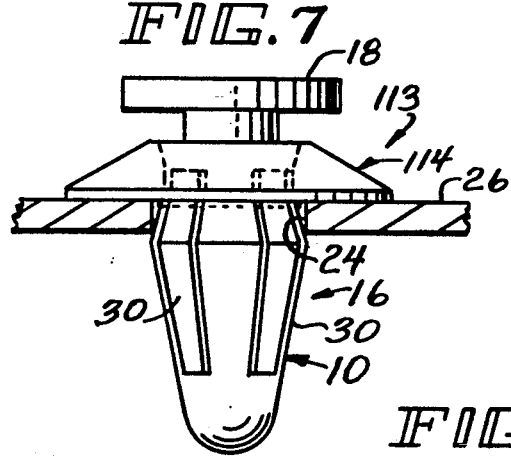
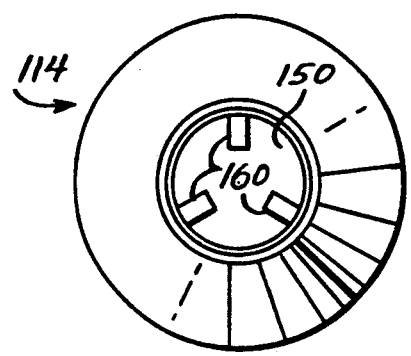
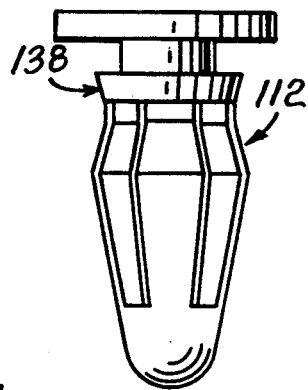
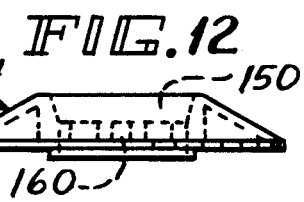
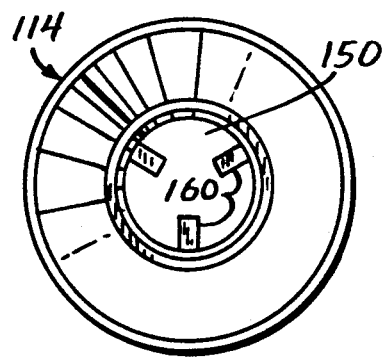
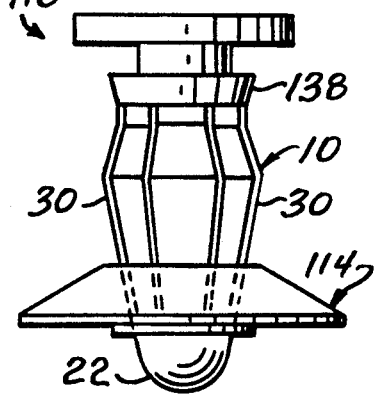
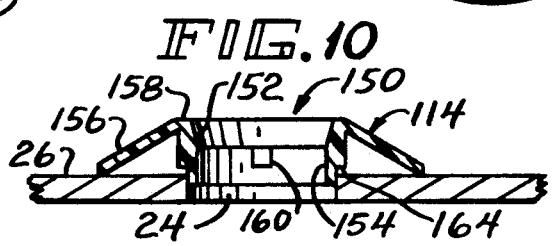
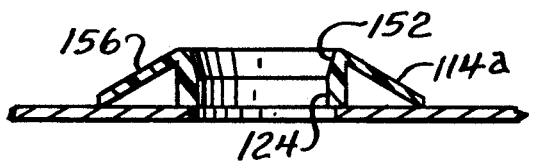

FASTENER ASSEMBLY WITH COMPRESSION MEMBER

BACKGROUND OF THE INVENTION

1. Field of the Invention

This invention relates generally to fasteners and more particularly to a push-in panel fastener assembly which includes retaining members to resiliently retain the fastener within panel apertures so as to connect two or more panels together and provides an engagement member for compression of the retaining members before installation of the fastener within the panel apertures so as to prevent contact between the panel and the retaining members and reduce or eliminate damage to the retaining members from the panel.

2. Description of the Related Art

Panel fasteners are typically utilized in automobile assembly operations so as to hold two or more panels together or to connect another article to a panel by inserting the fastener within an aperture formed in the panels or panel. To resiliently retain such fasteners wtihin the panel aperture, the fasteners include some type of resilient retaining member along a shank portion of the fastener, such as one or more outwardly extending legs, a plurality of barbs or similar structures.

Such fasteners, however, typically rely on the panel to compress the resilient retaining members upon insertion of the shank within the panel aperture. Since the panels are typically formed from metal, the sharp edges about the panel aperture shear and/or tear the retaining members during insertion. This results in high installation forces as well as deformation of the fastener which not only can cause lower retention forces and failure of the fastener, but can prevent its removal and/or reinstallation especially if a plastic fastener is utilized.

It therefore would be desirable to provide a fastener assembly for resilient retention within an aperture of a panel or panels which includes retaining members that are compressed by another portion of the fastener assembly, rather than the panel, prior to insertion within the panel aperture so as to thereby eliminate damage to the fastener from the panel, reduce insertion forces and failure, and enable removal and reinstallation of the fastener.

SUMMARY OF THE INVENTION

The invention provides a fastener assembly for engagement with an aperture in an article. The assembly includes a fastener having at least a shank, a head at a first end of the shank and a resilient retaining member along the shank for releasably retaining the fasteners within the article after insertion of at least a portion of the retaining member within the aperture. An engagement member is also provided for compressing the retaining member prior to insertion within the aperture and contact of the retaining member with the article and for preventing compression of the retaining member by the article about the aperture.

Various other objects, features, and attendant advantages of the present invention will become more fully apparent from the following detailed description when considered in connection with the accompanying drawings, in which like reference characters designate like or corresponding parts throughout the several views, and wherein:

BRIEF DESCRIPTION OF THE DRAWINGS

FIG. 1 is a perspective exploded view of the fastener assembly of the invention illustrated in conjunction with a panel and a panel aperture;

FIG. 2 is a side elevational view of the fastener assembly of the invention with the compression ring and panel illustrated in cross-section prior to insertion of the fastener into the panel aperture;

FIG. 3 is a side elevational view of the fastener assembly, similar to FIG. 2, illustrating an intermediate insertion position of the fastener within the panel aperture and compression of the fastener by the compression ring;

FIG. 4 is a side elevational view of the fastener assembly, similar to FIGS. 2 and 3, illustrating the final engaged position of the fastener within the panel aperture;

FIG. 5 is a side elevational view of another embodiment of the fastener assembly of the invention with the panel and compression ring illustrated in cross-section prior to insertion of the fastener within the panel aperture and showing the frangible connection between the fastener and the compression ring;

FIG. 6 is a side elevational view of the fastener assembly of FIG. 5 illustrating the final engaged position of the fastener within the panel aperture and the broken frangible connection between the fastener and the compression ring;

FIG. 7 is a side elevational view of another embodiment of the fastener assembly of the invention illustrated in the final engaged position of the fastener wtihin a panel aperture;

FIG. 8 is a side elevational view of the fastener assembly of FIG. 7 illustrating the fastener with the compression ring assembled thereto before insertion wtihin a panel aperture;

FIG. 9 is a side elevational view of the fastener of FIGS. 7 and 8;

FIG. 10 is a cross-sectional view of the compression member of FIGS. 7 and 8 illustrated with a thick panel;

FIG. 11 is a top plan view of the compression member of FIGS. 7 and 8;

FIG. 12 is a side elevational view of the compression member of FIGS. 7 and 8 with the internal structure illustrated in dotted outline;

FIG. 13 is a bottom plan view of the compression member of FIGS. 7 and 8; and

FIG. 14 is a cross-sectional view of another embodiment of the compression member of the invention for use with thin panels.

DESCRIPTION OF THE PREFERRED EMBODIMENTS

Referring to FIGS. 1-4, a fastener assembly embodying the invention is designated generally by the reference numeral 10. The assembly 10 includes a fastener member 12 and a compression ring 14.

The fastener 12 is preferably a push-in type of fastener including a shank portion 16 having a head portion 18 integrally formed to a first proximal end 20 of the shank 16 and a distal end 22 for insertion within an aperture 24 of a panel 26. In order to resiliently retain the shank 16 within the panel aperture 24, the shank portion 16 is formed to include some type of retaining mechanism or member 28 along its length between the proximal end 20 and the distal end 22. Preferably, the retaining mechanism 28 includes a plurality of resilient leg, prong or barb members 30 which form the shank 16 and provide the shank 16 with a hollow core 31. The legs 30 are integrally formed at one end with a bottom side 32 of the head 18 and are interconnected at the opposite end to form the distal end 22 of the shank 16. To retain the legs 30 within the panel aperture 24, each leg 30 is bowed outward to include an engagement rib 33 which flexes inward and outward to provide fastening as described below.

Although three leg members 30 are illustrated, the number of leg members 30 can vary. Additionally, it is to be understood that the particular type of retaining mechanism 28 can vary so long as it functions as described herein.

The compression ring 14 preferably includes a central tapered aperture 34 having a diameter D slightly less than the diameter D' of the aperture 24 of the panel 26. As FIG. 1 illustrates, the compression ring 14 can be formed as a member separate from the fastener 12. To provide a one-piece assembly 10 for ease of installation, FIGS. 5 and 6 illustrate another embodiment of the compression ring 14 which is frangibly connected to the legs 30 of the fastener 12 by frangible connecting members 36 positioned about the periphery of the ring aperture 34.

If a fastener 12 is inserted within the panel aperture 24 without the compression ring 14, the panel aperture 24 compresses the legs 30 upon entering the panel aperture 24 until the engagement ribs 33 of each leg 30 clear the back side 37 of the panel aperture 24. Upon continued insertion, the engagement ribs 33 expand outwardly behind the panel 26 and retain the fastener 12 to the panel 26. As described above, however, since the panels 26 are typically made from a harder material than the fastener 12, the edges of the panel aperture 24 tend to be sharp and the panel 26 tends to shear and/or tear the legs 30 of the fastener 12 during installation.

When the compression ring 14 is utilized, however, the compression ring 14, rather than the panel 26 compresses the legs 30. The compression ring 14 does not shear or tear the legs 30 since the compression ring 14 is typically made from the same material as the fastener 10.

Preferably, both the compression ring 14 and fastener 12 are formed from plastic which provides a low coefficient of surface sliding friction between the two members. Additionally, in order to further reduce the sliding co-efficient of friction, the compression ring 14 and the fastener 12 can be formed from dissimilar plastics. The compression ring 14, however, can be made of any desired material so long as it does not shear, deform or tear the legs 30.

In order to connect another member to the fastener 12 and provide a seal about the panel aperture 24 of the panel 26, the head 18 can include an additional disc member 38 between the head 18 and the legs 30. The disc member 38 is preferably conical on its underside facing the legs 30 and slightly flexible. Thus, the disc member 38 has an "umbrella" shape and can flatten out upon contact with the compression ring 14 as illustrated in FIG. 4 and provide the desired seal. This flexibility combined with the design of the retaining member 28 also enables the fastener 12 to take up any slack that may exist between the fastener 12, the compression ring 14 and the panel 26. Alternatively, in order to provide sealing of the panel aperture 24, the compression ring 14 can be conical (not illustrated) for use with the head 18 with or without the disc member 38.

To install the assembly 10 to a panel 26, the fastener 12 and compression ring 14 are aligned with the panel aperture 24 as illustrated in FIG. 2 where the aperture 34 of the compression ring 14 tapers toward the panel aperture 24. Alternatively, for ease of assembly, the compression ring 14 can be pre-driven a slight distance onto the legs 30 so as to retain the compression ring 14 on the legs 30 until installation is desired.

As FIG. 3 illustrates, the fastener 12 is then pushed in the direction of arrow "A" first into the tapered aperture 34 of the compression ring 14 and then into the panel aperture 24. The tapered aperture 34 gradually and uniformly deflects or compresses the legs 30 which causes the engagement ribs 33 of each leg 30 to flex inward in the direction of arrows "B". As FIG. 4 illustrates, further insertion of the fastener 12 in the direction of arrow "A" causes the engagement ribs 33 of each leg 30 to clear the panel aperture 24 and the flex outward so as to seat behind the panel 26 and inhibit removal with a predetermined retention force which varies with the type of material and retaining mechanism utilized.

In the embodiment of FIGS. 5 and 6, the fastener 12 operates substantially the same as the fastener in the embodiment of FIGS. 1-4 except that the frangible connecting members 36 are broken as the fastener 12 is inserted within the panel aperture 24.

Thus, the fastener assembly 10 enables lower insertion forces by minimizing installation friction, provides higher retention forces by eliminating damage to the retaining legs 30 during insertion and provides sealing about the panel aperture 24. Additionally, since damage to the retaining legs 30 is eliminated during insertion, the fastener 12 can be removed and reused enabling correction of assembly errors and re-assembly after future repairs to the automobile or other article having the panels 26.

FIGS. 7-13 illustrate another embodiment of the fastener assembly 110 where common elements are designated by the same reference numerals. In this embodiment the compression member 114 is designed to be pre-assembled to the fastener 112 for ease of installation as described in detail below.

The fastener 112 does not include the disc member 38 but is formed to include a tapered shoulder 138 proximate the position of the disc member 38. The head 18, shank 16 and resilient leg members 30 are substantially the same as in the embodiments of FIGS. 1-6.

As FIG. 10 illustrates, the compression member 114 is modified to be more of a bushing having a central aperture 150 including a first tapered portion 152 and a second linear portion 154. To provide a seal against the panel 26, the compression member 114 includes an outwardly extending tapered skirt 125 which is integrally formed with a first end 158 of the compression member 114.

Thus, the skirt 156 functions similarly to the disc member 38 of the embodiments of FIGS. 1-6 so as to provide the desired seal and take up any slack that may exist. It is to be noted that the aperture 150 of the compression member 114, as well as the aperture 34 of the compression member 14 of the embodiments of FIGS. 1-6, can be formed as circular, rectangular or any other desired shape.

As FIGS. 10-13 illustrate, to pre-assemble the compression member 114 to the fastener 112, the second linear portion 154 preferably includes three assembly tabs 160 which are integrally formed therewith and extend into the center of the aperture 150 a predetermined distance. The number, shape and position of the assembly tabs 160 can vary.

In use, as FIG. 8 illustrates, the compression member 114 is inserted over the distal end 22 of the fastener 112 until the assembly tabs 160 seat between the leg members 30. Upon insertion with a panel aperture 24 the compression member 114 and assembly tabs 160 move along the leg members 30 until the tapered portion 152 seats against the shoulder 138 on the fastener 112. Upon continued insertion of the fastener 112 within the panel aperture 24, the skirt 156 compresses against the panel 26 until the engagement ribs 33 of the legs 30 clear the back side of the panel 26 so as to maintain the final assembly position illustrated in FIG. 7.

As FIG. 10 illustrates, in order to center the compression member 114 with respect to the panel aperture 24 and reduce the insertion distance, a second end 162 of the compression member 114 includes a recess or reduced diameter centering ring 164 formed about its external periphery which seats within the panel aperture 24. Preferably, the recess or centering ring 164 is utilized with thicker panels where the fastener must remain deflected over a greater range or insertion distance before installation is complete.

When the centering ring 164 is utilized, it reduces the distance over which the fastener 112 must be inserted before the legs 30 snap behind the panel 26. This is especially advantageous with a panel formed from composite materials which are being utilized in automobile door panels and other components and are somewhat thicker than sheet metal panels.

FIG. 14 illustrates another embodiment of the compression member 14a which does not include the recess or centering ring 164. Preferably, the compression member 114a is utilized with panels that are relatively thinner and operates the same as the compression member 114 of the embodiment of FIGS. 7–13.

Modifications and variations of the present invention are possible in light of the above teachings. A specific dimension, material or construction is not required so long as the assembled device is able to function as herein described. It therefore is to be understood that within the scope of the appended claims the invention may be practiced otherwise than specifically described.

What is desired to be secured by letters patent is:

1. A fastener assembly for engagement with an aperture defined wtihin a first article in order to mount a second article upon said first article, comprising:
   a fastener having a head portion disposed at a first end of said fastener; a distal end portion disposed at a second opposite end of said fastener for insertion within said aperture of said first article; and a resilient shank portion interconnecting said head and distal end portions of said fastener and having retaining means disposed thereon for releasably retaining said fastener within said aperture of said first article, after insertion of said resilient shank portion within said aperture of said first article, as a result of said retaining means of said resilient shank portion engaging said first article; and
   engagement means, separate and independent of said first and second articles, and disposed about said resilient shank portion, for compressing said resilient shank portion radially inwardly prior to insertion of said retaining means through said aperture of said first article so as to prevent contact and radially inward compression of said retaining means by wall portions of said first article defining said aperture of said first article.

2. The assembly as defined in claim 1 wherein said engagement means are integrally formed with a portion of said shank.

3. The assembly as defined in claim 1 wherein said engagement means are formed as an annular ring having a central aperture therethrough, said ring aperture having a diameter equal to or less than the diameter of said aperture of said first article and said ring aperture being defined by an inside surface frangibly connected to a portion of said shank for providing a one-piece assembly.

4. The assembly as defined in claim 3 wherein said inside surface of said ring aperture is axially tapered away from said head so as to gradually uniformly compress said resilient shaft portion during the insertion within said aperture of said first article.

5. The assembly as defined in claim 1 wherein said head potion includes means for connecting another article thereto.

6. The assembly as defined in claim 1 wherein said head portion includes means for sealing about said aperture of said first article.

7. A fastener assembly as set forth in claim 6, wherein:
   said means for sealing said aperture comprises a disc portion fixedly mounted upon said fastener between said head portion and said shank portion.

8. A fastener assembly as set forth in claim 7, wherein:
   said disc portion has a substantially frusto-conical structure such that said disc portion exhibits a substantially umbrella-shaped configuration.

9. The assembly as defined in claim 1 wherein said retaining means can accommodate articles of varying thicknesses.

10. The assembly as defined in claim 1 wherein said retaining means of said fastener can be utilized for holding at least two articles together, each article having a predetermined thickness and a respective aperture therethrough for axial alignment, insertion and retaining of said shank within said apertures.

11. The assembly as defined in claim 1 wherein said engagement means are formed as an annular ring having a predetermined thickness and a central aperture therethrough, said ring aperture having a diameter equal to or less than the diameter of said aperture of said first article and said ring aperture being defined by an inside surface including at least one assembly tab connected thereto and extending a predetermined radial distance away from said inside surface toward the center of said ring aperture for releasably retaining said annular ring to a portion of said shank.

12. The assembly as defined in claim 9 wherein said annular ring includes a conical skirt having a first tapered end integrally formed with an external periphery of said annular ring for sealing about said aperture of said first article.

13. The assembly as defined in claim 11 wherein said engagement means include means for centering said engagement means with respect to said aperture of said first article and for reducing the distance through which said fastener is inserted.

14. A fastener assembly as set forth in claim 1, wherein:
   said resilient shank portion comprises a plurality of resilient, circumferentially spaced leg members;
   said retaining means comprises a plurality of radially outwardly bowed sections of said plurality of resilient leg members which define engagement ribs for engaging said first article; and said engagement means comprises an annular compression ring for compressing said plurality of resilient leg members radially inwardly as said compression ring is moved axially between said distal and head end portions of said fastener.

15. A fastener assembly as set forth in claim 14, wherein:

said plurality of resilient, circumferentially spaced leg members comprises three circumferentially spaced leg members.

16. A fastener assembly as set forth in claim 1, wherein:

said fastener and said engagement means are fabricated from a plastic material.

17. A fastener assembly for engagement with an aperture defined within a first article in order to mount a second article upon said first article, comprising:

a fastener having a head portion disposed at a first end of said fastener; a distal end portion disposed at a second opposite end of said fastener for insertion within said aperture of said first article; and resilient retaining means interposed between said head and distal end portions for releasably retaining said fastener within said aperture of said first article, after insertion of said resilient retaining means within said aperture of said first article, as a result of said retaining means engaging said first article;

engagement means movably disposed upon said fastener between a first, pre-assembled position within the vicinity of said distal end portion of said fastener, and a second operative position within the vicinity of said head portion of said fastener at which said engagement means compresses said resilient retaining means radially inwardly prior to insertion of said resilient retaining means through said aperture of said first article so as to prevent contact and radially inward compression of said resilient retaining means by wall portions of said first article defining said aperture of said first article and thereby prevent damage to said resilient retaining means by said first article; and means defined between said engagement means and said fastener for retainably mounting said engagement means upon said fastener at said first, pre-assembled position such that said fastener and said engagement means comprise a one-piece assembly.

18. A fastener assembly as set forth in claim 17, wherein:

said fastener further comprises a plurality of resilient leg portions interconnecting said head and distal end portions of said fastener;

said resilient retaining means comprises a plurality of outwardly bowed sections of said plurality of resilient leg portions which define engagement ribs for engaging said first article; and said means for retainably mounting said engagement means upon said fastener comprises a plurality of frangible connecting members interconnecting said engagement means to said resilient leg portions at an axial position of said fastener defined between said distal end portion of said fastener and said outwardly bowed sections of said plurality of resilient leg portions.

19. A fastener assembly as set forth in claim 17, wherein:

said fastener further comprises a plurality of resilient leg portions interconnecting said head and distal end portions of said fastener and circumferentially spaced with respect to each other so as to define circumferentially spaced slots therebetween;

said resilient retaining means comprises a plurality of outwardly bowed sections of said plurality of resilient leg portions which define engagement ribs for engaging said first article; and said means for retainably mounting said engagement means upon said fastener comprises a plurality of assembly tabs integral with said engagement means and disposed wtihin said circumferentially spaced slots defined between said leg portions of said fastener for movement within said circumferentially spaced slots between said distal and head end portions of said fastener.

20. A fastener assembly as set forth in claim 19, wherein:

said plurality of resilient leg portions comprises three resilient leg portions; and said plurality of assembly tabs comprises three assembly tabs for disposition within said circumferentially spaced slots defined between said three leg portions.

* * * * *